US009264264B2

(12) United States Patent
He

(10) Patent No.: US 9,264,264 B2
(45) Date of Patent: Feb. 16, 2016

(54) SYSTEMS AND METHODS FOR FILTERING A RECEIVED SIGNAL TO REMOVE INTERSYMBOL INTERFERENCE

(71) Applicant: Marvell International Ltd., Hamilton (BM)

(72) Inventor: Runsheng He, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/313,196

(22) Filed: Jun. 24, 2014

(65) Prior Publication Data

US 2014/0307826 A1 Oct. 16, 2014

Related U.S. Application Data

(63) Continuation of application No. 11/656,729, filed on Jan. 23, 2007, now Pat. No. 8,767,813, which is a continuation of application No. 09/572,155, filed on May 17, 2000, now Pat. No. 7,167,516.

(51) Int. Cl.
| | |
|---|---|
| *H03H 7/30* | (2006.01) |
| *H04L 25/03* | (2006.01) |
| *H04L 7/00* | (2006.01) |
| *H04L 7/033* | (2006.01) |
| *H04L 25/49* | (2006.01) |

(52) U.S. Cl.
CPC ........ *H04L 25/03057* (2013.01); *H04L 7/0062* (2013.01); *H04L 7/0334* (2013.01); *H04L 25/0307* (2013.01); *H04L 25/4917* (2013.01); *H04L 2025/0349* (2013.01)

(58) Field of Classification Search
CPC ............... H04L 25/03057; H04L 25/03006; H04L 25/03019
USPC ................................................ 375/233, 232
See application file for complete search history.

(56) References Cited

U.S. PATENT DOCUMENTS

| | | | |
|---|---|---|---|
| 4,789,994 A | 12/1988 | Randall et al. | |
| 4,896,334 A * | 1/1990 | Sayar | H04B 3/235 370/276 |
| 5,132,988 A | 7/1992 | Fisher et al. | |
| 5,159,291 A | 10/1992 | Ghoshal | |
| 5,295,159 A | 3/1994 | Kerpez | |
| 5,430,661 A | 7/1995 | Fisher et al. | |
| 5,455,844 A | 10/1995 | Ishikawa et al. | |
| 5,661,528 A * | 8/1997 | Han | 348/607 |
| 5,675,612 A | 10/1997 | Solve et al. | |

(Continued)

OTHER PUBLICATIONS

Lin et al., "Adaptive Nonlinear Decision Feedback Equalization with Channel Estimation and Timing Recovery in Digital Magnetic RecordingSystems", IEEE Trans. on Circuits and Systems—II: Analog and Digital Signal Processing, vol. 42, No. 3, Mar. 1995, pp. 196-206.

*Primary Examiner* — Kevin Kim

(57) ABSTRACT

A communication device including circuitry configured to receive a signal transmitted to the communication device via a communication channel. A receiver is configured to generate a filter coefficient to be used for filtering the received signal, generate a gain coefficient, wherein the gain coefficient corresponds to a condition of the communication channel, adjust the filter coefficient using the gain coefficient, and filter the received signal using the filter coefficient, as adjusted using the gain coefficient, to remove intersymbol interference from the received signal.

8 Claims, 9 Drawing Sheets

(56) References Cited

U.S. PATENT DOCUMENTS

| | | | |
|---|---|---|---|
| 5,684,827 A * | 11/1997 | Nielsen | 375/232 |
| 5,822,143 A | 10/1998 | Cloke et al. | |
| 5,995,539 A * | 11/1999 | Miller | 375/222 |
| 6,414,990 B1 | 7/2002 | Jonsson et al. | |
| 6,438,163 B1 * | 8/2002 | Raghavan et al. | 375/233 |
| 6,535,552 B1 | 3/2003 | Pessoa | |
| 6,693,958 B1 | 2/2004 | Wang et al. | |
| 7,088,793 B1 * | 8/2006 | Mickelson et al. | 375/341 |
| 7,154,198 B2 * | 12/2006 | Kawai | 310/12.15 |
| 7,167,516 B1 | 1/2007 | He | |
| 7,254,198 B1 * | 8/2007 | Manickam et al. | 375/348 |
| 7,623,600 B2 * | 11/2009 | Momtaz et al. | 375/345 |
| 2004/0005001 A1 * | 1/2004 | Jones et al. | 375/232 |
| 2005/0036541 A1 * | 2/2005 | McKown | 375/233 |
| 2005/0099907 A1 * | 5/2005 | Sawada et al. | 369/47.26 |
| 2006/0239655 A1 * | 10/2006 | Ogura et al. | 386/111 |

* cited by examiner

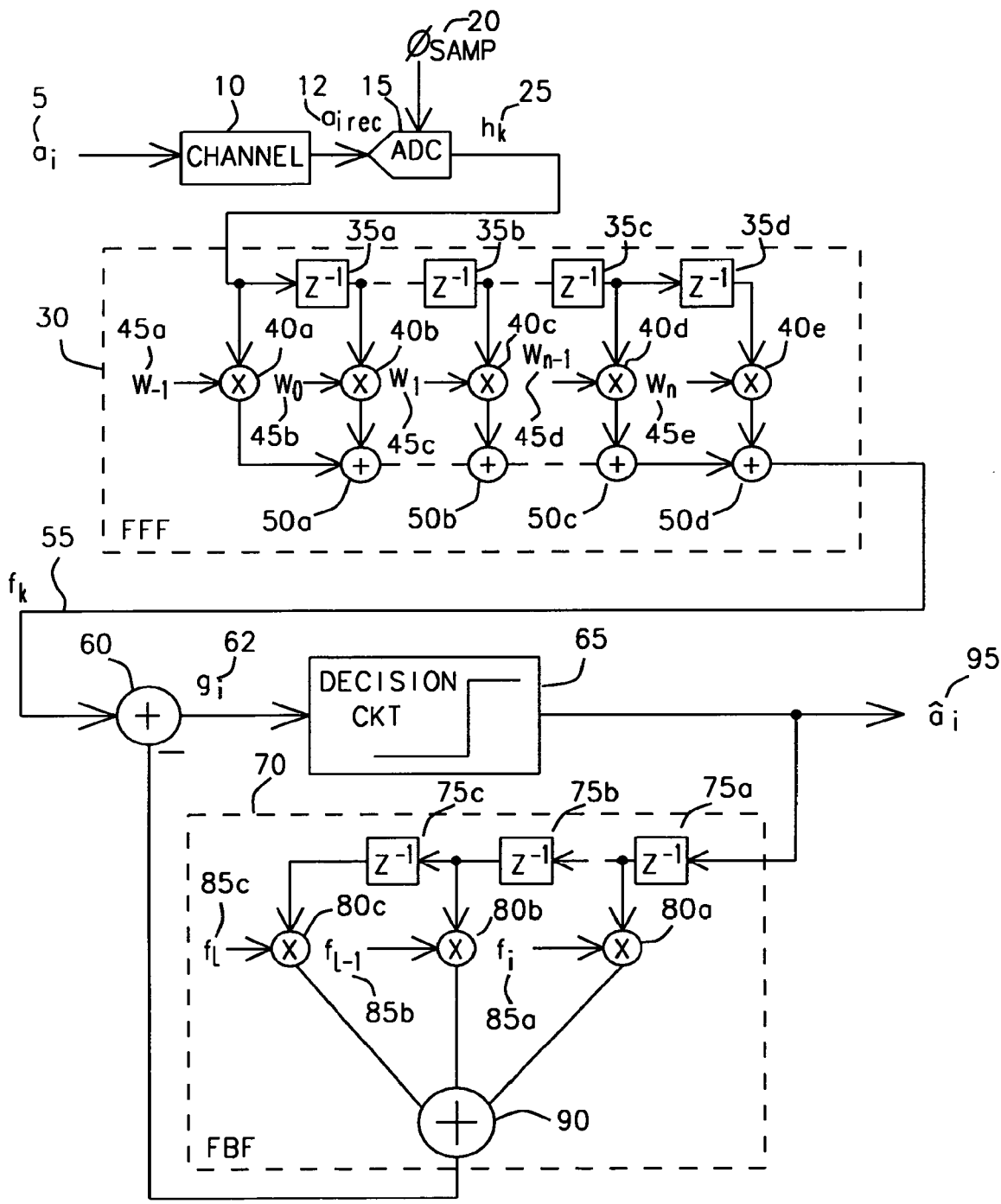
FIG. 1a – Prior Art

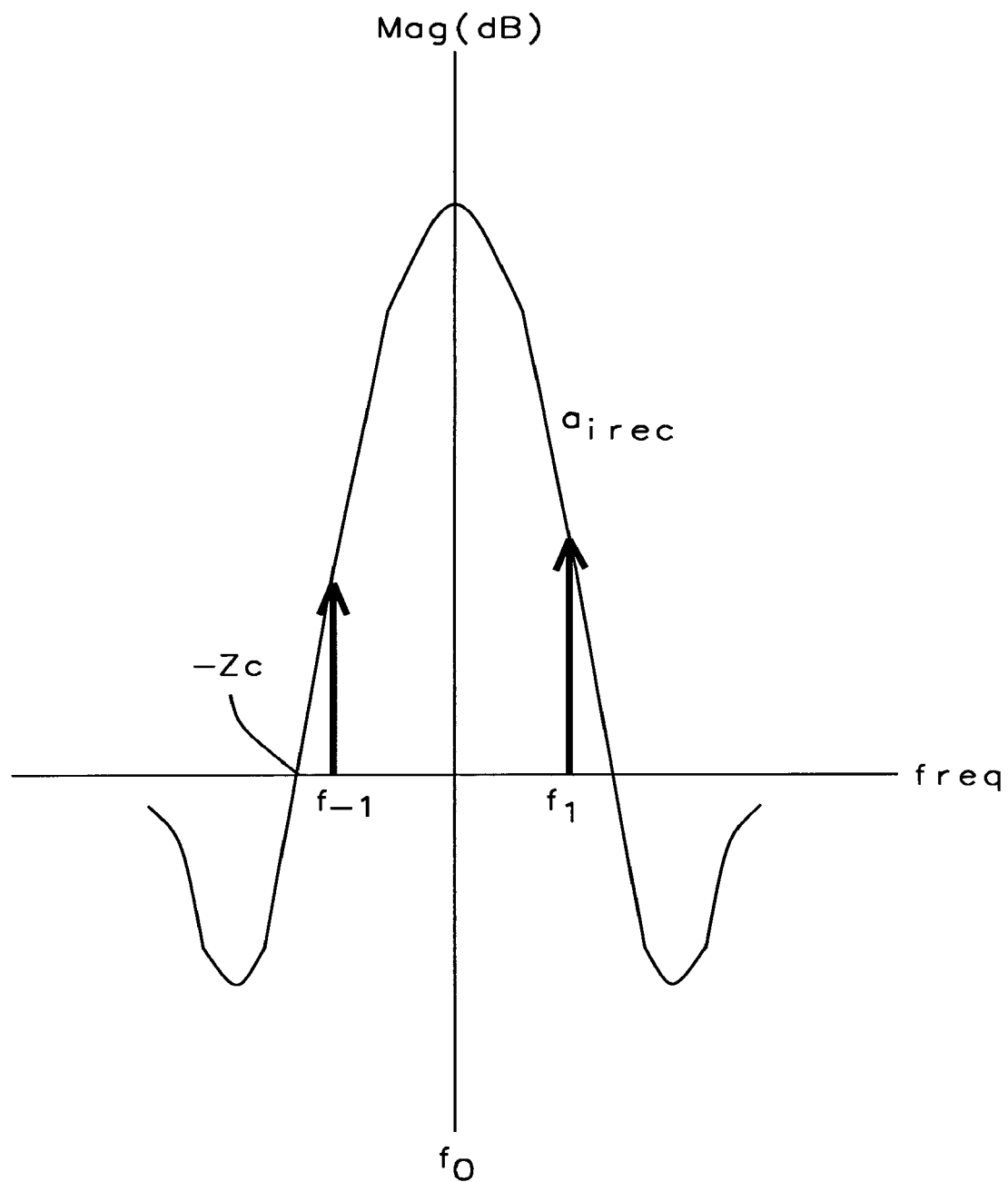
FIG. 1b – Prior Art

SYSTEMS AND METHODS FOR FILTERING A RECEIVED SIGNAL TO REMOVE INTERSYMBOL INTERFERENCE

CROSS-REFERENCE TO RELATED APPLICATIONS

The present disclosure is a continuation of U.S. patent application Ser. No. 11/656,729 (now U.S. Pat. No. 8,767,813), filed on Jan. 23, 2007, which is a continuation of U.S. patent application Ser. No. 09/572,155 (now U.S. Pat. No. 7,167,516), filed on May 17, 2000. The entire disclosures of the applications referenced above are incorporated herein by reference.

FIELD

This invention is generally related to receivers in a communication system. More particularly, this invention is related to removal of precursor intersymbol interference from encoded signals received on a communication channel.

DESCRIPTION OF THE RELATED ART

In digital communication systems such as the popular Fast Ethernet, digital data is formatted to a pulsed multilevel voltage signal to be transferred through a communication channel such as common telephone wire, fiberoptic cable or open atmosphere. It is well known in the art that as the pulsed multilevel voltage signal transits the communication channel, the communication channel acts as a low pass filter and that the pulsed multilevel voltage signal becomes a continuous time signal. The low pass filter spreads or smears the shape of the input pulsed multilevel voltage signal to form the continuous time signal.

The operation can be described mathematically by the convolution of the function of the pulsed multilevel voltage signal x(t–τ) by a continuous time channel response h(t). That is $$r(t) = \int_{-\infty}^{+\infty} h(\tau)x(t-\tau)d\tau \qquad \text{EQ. 1}$$

$$= \int_{-\infty}^{+\infty} x(\tau)h(t-\tau)d\tau$$

where:
r(t) is the received continuous time signal,
h(t) is the channel response
x(t) is the pulsed multilevel voltage signal.

The second half of the formula is a result of the fact that convolution is a commutative process.

The pulsed multilevel voltage signal is expressed as the function $x(t)=0$ for $t \neq T$ $x(t)=X_k\delta(t-kT)$ for $t=kT$ where:
T is the period of a symbol of the encoded digital data,
k is a counting variable representing integral periods of the symbols,
$X_K$ is the voltage level of the pulsed multiple level voltage signal a the time kT.

As is known in the art, the significant values in the integration occur where τ=KT. Therefore, the integration of Eq.1 can be rewritten as:

$$r(t) = \sum_{-\infty}^{\infty} x_k h(t-kT) \qquad \text{EQ. 2}$$

EQ. 2, as written, still represents a continuous time system rather than the discrete time system employed in most digital communication systems. In pulse amplitude modulated systems, such as Ethernet, the sampling rate of the discrete time system is at the symbol transmit rate $$\left(\frac{1}{T}\right)$$

and therefore can be written as:

$$r(nt) = \sum_{-\infty}^{\infty} x_k h(nT-kT) \qquad \text{EQ. 3}$$

This can be rewritten as:

$$r(nT) = \sum_{-\infty}^{N} x_k h(nT-kT) \qquad \text{EQ. 4}$$

Since the sampling clock of a receiver generally is not perfectly aligned with the clock of the transmitter of the communication system, the sampling phase offset will be non-zero. To account for the arbitrary phase offset, EQ. 4 is rewritten to add an offset time to the time index. EQ. 4 is now written as:

$$r(nT+t_0) = \sum_{-\infty}^{N} x_k h(t_0+nT-kT) \qquad \text{EQ. 5}$$

The first term of EQ. 5 is the component of the received signal of the nth symbol. The remaining terms in the summation are intersymbol interference (ISI) terms, previous symbols (postcursor intersymbol interference) and subsequent symbols (precursor intersymbol interference).

Refer now to FIG. 1a to discuss a typical communication system. The digital data is scrambled, encoded and formed into a symbol that forms the pulsed multilevel voltage signal $a_i$ 5. The pulsed multilevel voltage signal $a_i$ 5 is transferred to the communication channel 10. The communication channel 10, as described above, has the impulse response h(t) and acts as a low pass filter to distort the pulsed multilevel voltage signal $a_i$ 5. The communication channel 10 includes the driver circuitry, receiver circuitry and the connecting transmission medium. FIG. 1b is a plot of the magnitude of the received pulsed multilevel voltage signal $a_{irec}$ 12 versus frequency. As is shown, the frequency content of the received pulsed multilevel voltage signal $a_{irec}$ 12 contains the frequencies of the previous and subsequent symbols of the received pulsed multilevel voltage signal $a_{irec}$ 12. To demonstrate the frequencies EQ. 5 is reorganized with the magnitude of the pulsed multilevel voltage signal $a_i$ 5 included as follows:

$$a_{irec}=a_{i+1}f-1+a_{0-1}f+1+\ldots \qquad \text{EQ. 6}$$

The output of communication channel 10 is the input to an analog-to-digital converter (ADC) 15. The analog-to-digital converter 15 samples the received signal from the communication channel to create the sampled digitized version $h_k$ 25 of the received signal. The sampled digitized version $h_k$ 25 of the received signal contains the precursor and postcursor intersymbol interference described above. Removal of the precursor intersymbol interference is accomplished by the feed forward filter 30. The decision feedback filter 70 accomplishes the removal of the postcursor intersymbol interference ($a_i$–1f+1+ ... of EQ. 6).

The feed forward filter 30 consists of multiple delay elements 35a, 35b, 35c and 35d that are serially connected output to input. The input of the first delay element is connected to the analog-to-digital converter 15 to receive the sampled digitized received signal $h_k$ 25. Each delay element 35a, 35b, 35c and 35d delays the sampled digitized received signal $h_k$ by the amount of time of the period of the sampling clock of the analog-to-digital converter 15. The outputs of the analog-to-digital converter 15 and the delay elements 35a, 35b, 35c and 35d respectively are connected to the multiplier circuits 40a, 40b, 40c, 40d and 40e. Each delayed version of the sampled digitized received signals is multiplied by one of the filter coefficients $w_x$, 45a, 45b, 45c, 45d and 45e. The output of each of the multiplier circuits 40a, 40b, 40c, 40d and 40e are connected to the combining circuits 50a, 50b, 50c and 50d. The combining circuits 50a, 50b, 50c and 50d additively combine the resulting products from the multiplier circuits 40a, 40b, 40c, 40d and 40e to form the sampled digitized signal $f_k$ 5 having the precursor intersymbol interference removed.

The filter coefficients $w_x$, 45a, 45b, 45c, 45d and 45e normally are chosen as a function of an error signal $e_k$ determined as the difference of the estimated value $\hat{a}_i$ 95 of pulsed multilevel voltage signal $a_i$ 5 and the sampled digitized signal $g_i$ 62 having the total intersymbol interference removed. That is: $e_k = (g_i - \hat{a}_k)$.

The sampled and digitized signal $f_k$ 5 having the precursor intersymbol interference removed and the output of feedback filter 70, which is the calculated postcursor intersymbol interference, are subtractively combined in the combining circuit 60. The output of the combining circuit 60 is the input to the decision circuit 65. The decision circuit 65 determines the received estimate $a_i$ 95 of the pulsed multilevel voltage signal $a_i$. The received estimate $a_i$ 95 is the input of the feedback filter 70. The feedback filter 70 has multiple delay elements 75a, 75b, and 75c that are serially connected to delay the received estimate $\hat{a}_i$ 95 by a time equal to the period of the sampling clock of the analog-to-digital converter 15. The outputs of the delay elements 75a, 75b, and 75c are the inputs to the multiplier circuits 80a, 80b, and 80c. The multiplier circuits multiply the delayed received estimates $\hat{a}_i$ by the filter coefficients $f_x$ 80a, 80b, and 80c. The products of the multiplier circuits 75a, 75b, and 75c are additively combined in the combining circuit 90 to form the estimate of the postcursor intersymbol interference to be removed from the received, sampled and digitized pulsed multilevel voltage signal $f_k$ 5.

The filter coefficients $f_x$ 85a, 85b, and 85c are adaptively chosen by tracking the error signal $e_k$ that is determined as the difference of the estimated value $\hat{a}_i$ 95 of pulsed multilevel voltage signal $a_i$ 5 and the sampled digitized signal $g_i$ 62, which is the output of the combining circuit 60.

In EQ. 5, it is apparent that the sampling phase offset contributes to the magnitude of the precursor and postcursor intersymbol interference. The better aligned the sampling clock and the transmit clock, the less intersymbol interference in the sampled digitized version of the received signal $h_k$ 25.

The timing phase adjustment signal $\phi_{samp}$ 20 is used to adjust the sampling position within the period of the pulsed multilevel voltage signal $a_i$. A clock extraction circuit and a phase-locked loop generally establish the timing of the sampling clock of the ADC. Thus, the sampling phase, the filter coefficients $w_x$ 40a, 40b, 40c, 40d, and 40e, and the filter coefficients $f_x$ 85a, 85b, and 85c are interdependent in fully adaptive systems. It is desirable to uncouple the sampling phase and the filer coefficients $w_x$ 40a, 40b, 40c, 40d and 40e to find the best combinations of values and to improve stability.

In magnetic recording media, the nonlinear effects in the write process appear in the readback waveform as shifts in the peak positions and changes in the amplitude. The pulse shift causes a nonlinear intersymbol interference (ISI) on the readback signal. "Adaptive Nonlinear Decision Feedback Equalization With Channel Estimation And Timing Recovery In Digital Magnetic Recording Systems" (Lin et al.), IEEE Transactions on Circuits and Systems II: Analog and Digital Signal Processing, Volume: 42 3, IEEE, pp. 196-206 describes a Volterra-DFE, in which a Volterra filter is used in the feedback section of decision feedback structure to equalize the nonlinear ISI.

U.S. Pat. No. 5,159,291 (Ghoshal) discloses a digitally controlled timing recovery loop with low intrinsic jitter and high jitter tolerance. The timing recovery loop has a triple loop structure for improved jitter tolerance and bandwidth control.

U.S. Pat. No. 5,430,661 (Fisher, et al.) teaches an adaptive decision feedback equalizer. The adaptive decision feedback equalizer operates in either a set-up/test mode or a run mode. The read signals input from a storage media are sampled, amplified and digitally processed to decode store information bits with the result that storage density may be increased and error rate decreased.

U.S. Pat. No. 5,822,143 (Cloke, et al.) describes a partial-response maximum-likelihood (PRML) sequence detector with decision feedback equalization (DFE) for a disk drive read channel. A DFE circuit generates a sequence of equalized samples and includes a feed forward filter that removes precursor ISI from the sequence of sample signal to produce a sequence of feed-forward equalized samples, detection logic that translates the sequence of equalized samples into a sequence of detected symbols and a feedback filter that filters the sequence of detected symbols to produce a sequence of equalization feedback values to offset postcursor ISI remaining in the sequence of feed-forward equalized samples.

SUMMARY

An object of this invention is providing an apparatus to determine a sampling phase of a sampling clock of an analog-to-digital converter in a receiver of a communication system.

Another object of this invention is to adjust the sampling clock of an analog-to-digital converter in a receiver of a communication system based on the determined sampling phase of the sampling clock to remove a first intersymbol interference from a signal received by the receiver.

Further, another object of this invention is to provide an open loop filter to remove any remaining intersymbol interference from the received signal.

And still further, another object of this invention is to provide a receiver within a communication system where the adaptive equalization necessary to eliminate precursor and postcursor intersymbol interference is decoupled and independent.

To accomplish these and other objects a circuit for canceling precursor intersymbol interference from a signal within a communication receiver has an adaptive timing loop circuit, which adjusts a timing phase of a sampling clock of an analog-to-digital converter within the communication receiver. The adjustment of the timing phase of the sampling clock removes a first precursor intersymbol interference from the signal. The circuit additionally has an open loop finite impulse response filter, which is connected to the output of the analog-to-digital converter. A coefficient of the open loop finite impulse response filter is determined by a gain mapping of a condition measurement of the communication receiver to cancel all precursor intersymbol interference beyond the first precursor intersymbol interference.

The adaptive timing loop circuit includes a first delay element connected within the communication receiver to acquire an error signal and to delay the error signal by one sampling period of the sampling clock. The error signal is a difference between an estimate of the transmitted data and an equalized version of received data indicative of an amount of the first precursor intersymbol interference. The adaptive timing loop additionally includes a first multiplier circuit connected within the communication receiver to receive the estimate of the transmitted data and to the first delay element to multiply a magnitude of the estimate of the transmitted data by a magnitude of the error signal to produce a first product. A second multiplier circuit is connected to receive a loop gain control constant and to the first multiplier to receive the first product. The second multiplier multiplies the loop gain control constant by the first product to form a second product. A combining circuit is connected to the second multiplier circuit and to an output of the adaptive timing loop circuit to subtractively combine the second product with a current timing phase adjustment signal to form a next timing phase adjustment signal. A second delay element delays the next timing phase adjustment signal to adjust the timing phase of a next sampling clock pulse.

The timing phase adjustment can be expressed by the formula:

$$\phi_{sampn+1} = \phi_{sampn} - \mu_f(\hat{a}_i e_{i-1})$$

where:

$\phi_{sampn+1}$ is the timing phase adjustment signal for the next sample $h_{n+1}$ 25 from the analog-to-digital converter 15, $\phi_{sampn}$ is the timing phase adjustment signal for the current sample $h_n$ 25 from the analog-to-digital converter 15, $\mu_f$ is the control constant, $e_{i-1}$ is the error signal for the previous sample.

The open loop finite impulse response filter includes a feed forward filter connected to the analog-to-digital converter to receive a sampled digital form of a received signal. The feed forward filter has a third delay element connected to the analog-to-digital converter to delay the sampled digital form of the received signal by one sampling period, a third multiplier circuit connected to the analog-to-digital converter to multiply the sampled digital form of the received signal by a filter coefficient to form a third product, and a third combining circuit to combine the delayed sampled digital form of the received signal with the third product to form a preliminary equalized signal. The open loop finite impulse response filter additionally has a fourth multiplier circuit connected to the feed forward filter to multiply the preliminary equalized signal by a constant gain factor to produce a signal having the intersymbol interference removed. A gain setting circuit is connected to the fourth multiplier circuit to generate the constant gain factor as a function of receiver condition, and a gain mapping circuit is connected to the third multiplier circuit and the gain setting circuit to provide the filter coefficient as a function of the constant gain factor.

The open loop finite impulse response filter generates its output signal according to the formula:

$$f_k = A_v(h_k + (h_{k+1}) * w_{-1})$$

where:

$f_k$ is the digitized and sampled pulsed multilevel voltage signal.

$A_v$ is the gain constant of the gain block 140.

$h_k$ is the present sampled and digitized received pulsed multilevel voltage signal.

$h_{k+1}$ is the next sampled and digitized received pulsed multilevel voltage signal.

$w_{-1}$ is the filter coefficient mapped from the gain constant $A_v$ of the gain block 140.

The gain setting circuit establishes the gain constant factor according to the formula:

$$G_k = G_{k-1} - \mu_{FF} e_i f_k$$

where:

$G_k$ is the current value of the gain constant factor at the output of the gain setting circuit.

$G_{k-1}$ is the previous value of the constant factor at the output of the gain setting circuit.

$\mu_{FF}$ is a small positive constant.

$f_k$ is digitized and sampled pulsed multilevel voltage signal.

$e_i$ is the error signal indicating the condition of the communication channel and is a difference between an estimate of the transmitted data and an equalized version of received data indicative of an amount of the first precursor intersymbol interference.

To execute to the above formula the gain setting circuit has a fifth multiplier circuit to multiply the error signal, the preliminary equalized signal, and a gain constant to produce a fourth product. The gain constant must be sufficiently small to insure stability of the gain setting circuit and sufficiently large so as to track variations in the condition measurement. The gain setting circuit further has a fourth delay element to delay a present constant gain factor by a sampling time of the sampling clock. A fourth combining circuit subtractively combines a previous constant gain factor with the fourth product to generate a present constant gain factor.

BRIEF DESCRIPTION OF DRAWINGS

FIG. 1a is a schematic diagram of a communication channel and receiver of the prior art.

FIG. 1b is a plot of the gain versus frequency of the communication channel of the prior art as shown in FIG. 1a.

DESCRIPTION

Figure 2:
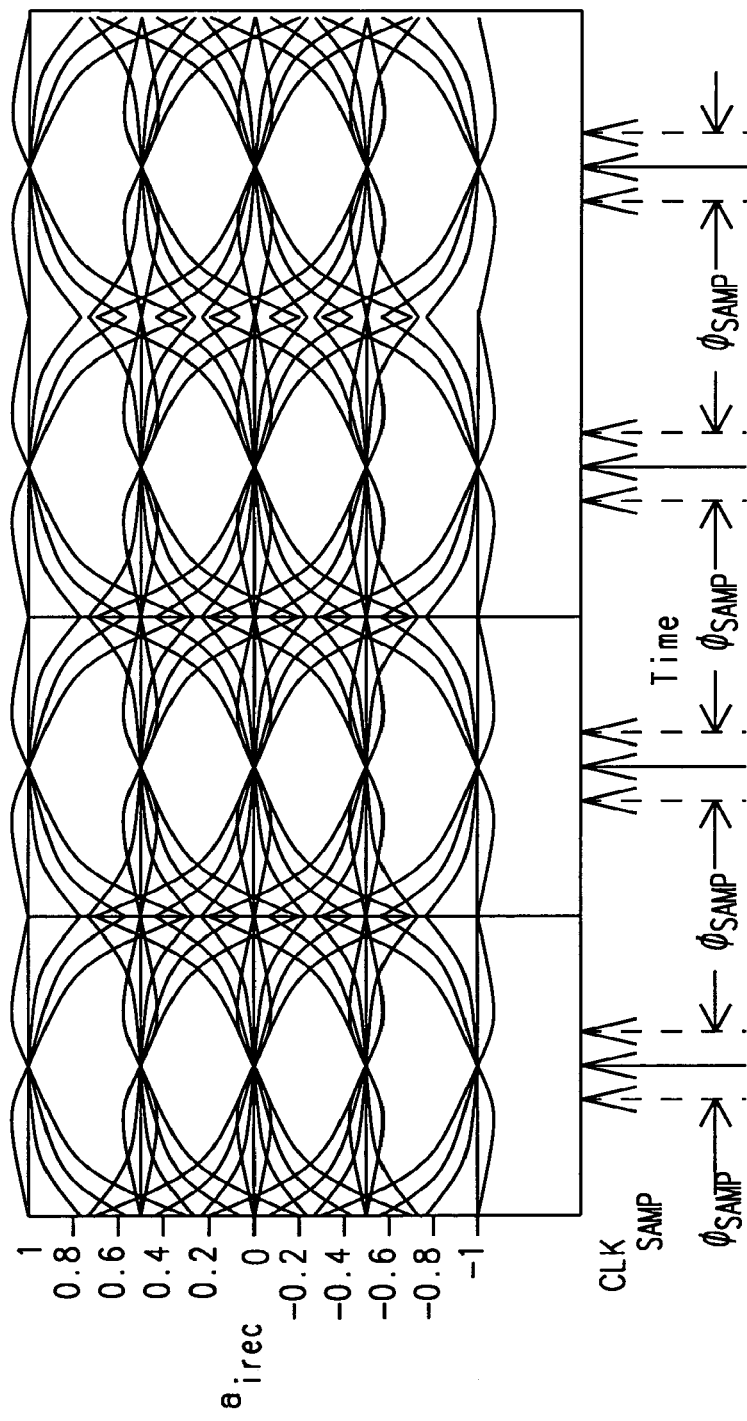
FIG. 2 is an eye diagram of the pulsed multilevel voltage signal having transited the communication channel and at the input of the receiver compared to the positioning of the sampling clock.

Refer now to FIG. 2 for a discussion of the impact of the sampling timing phase on the accuracy of the received estimate $\hat{a}_1$ of the pulsed multilevel voltage signal $a_i$. The plot of FIG. 2 is of the pulsed multilevel voltage signal $a_{irec}$ 12 after having transited the communication channel 10 and at the input of the analog-to-digital converter 15. It is apparent that the low pass filter characteristics of the communication channel have "smeared" the transitions between samples of pulsed multilevel voltage signal $a_{irec}$ 12. If the sampling clock $CLK_{samp}$ is placed incorrectly in the period, the effects of the adjacent signals impact the accuracy of the received signal. The timing phase adjustment signal $\phi_{samp}$ must adjust the timing clock $CLK_{samp}$ to insure a minimum of intersymbol interference.

Figure 3:
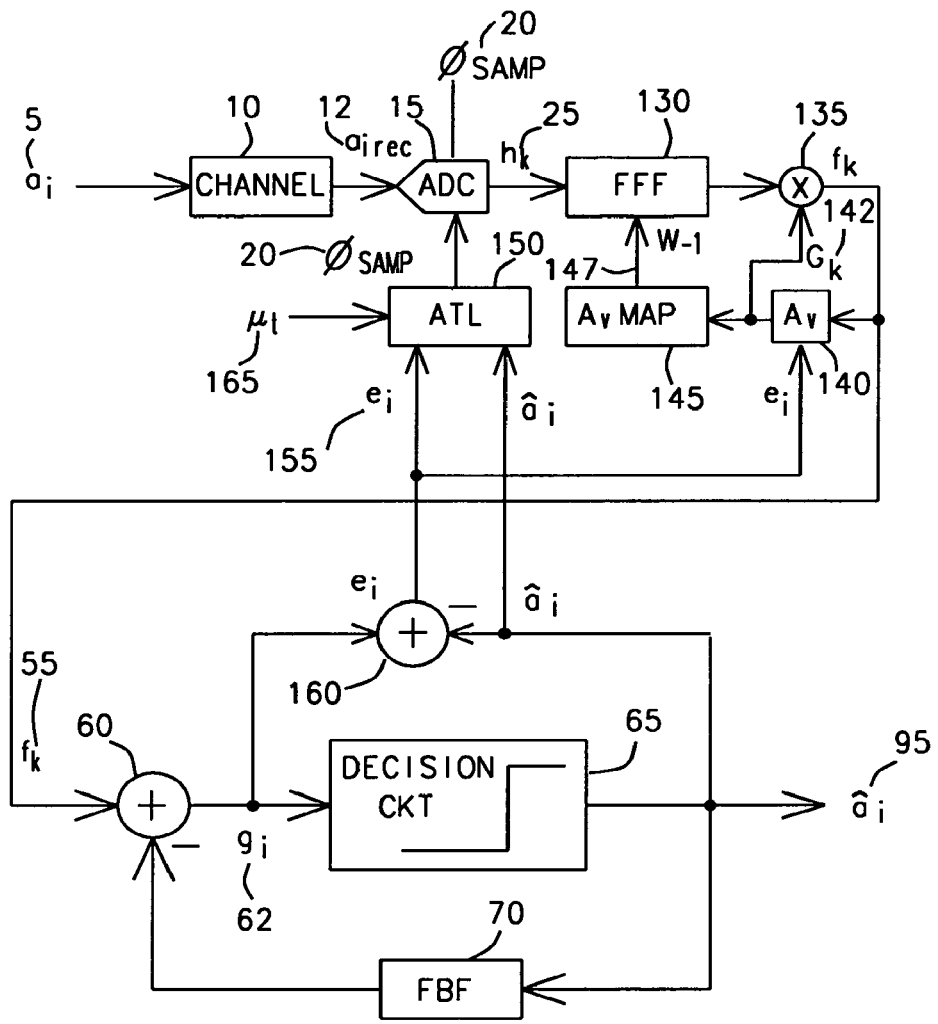
FIG. 3 is a block diagram of a communication channel and receiver of this invention.

Refer now to FIG. 3 to discuss the structure of the apparatus that is to remove the precursor intersymbol interference from the received pulsed multilevel voltage signal $a_{irec}$ 12. As described above, the digital data is encoded and formatted to form the pulsed multilevel voltage signal $a_1$ 5. The pulsed multilevel voltage signal $a_i$ 5 is transferred to the communication channel 10. The received pulsed multilevel voltage signal $a_{irec}$ 12 is the input to the analog-to-digital converter 15.

The phase sampling adjustment signal $\phi_{samp}$ 20 signals the adjustment necessary for the timing phase of the sampling clock of analog-to-digital converter 15 versus the clock of the transmitter (not shown). The output of the analog-to-digital converter 15, which is the sampled and digitized received pulsed multilevel voltage signal $h_k$ 25, is the input to the feed forward filter 130. The feed forward filter 130 is an open loop finite impulse response filter in which its filter coefficients are derived from a gain-to-coefficient map 145 connected to the feed forward filter 130.

The gain block 140 is an input of the gain-to-coefficient mapping circuit 145. The gain of the gain block 140 provides an indication of the condition of the communication channel 10.

The gain of the gain block 140 establishes an adaptive gain loop. The adaptive gain loop that is a function of the error signal $e_i$ 155 and the digitized and sampled pulsed multilevel voltage signal $f_k$ 55. The combining circuit 160 generates the error signal $e_i$ 155. The combining circuit subtractively combines the digitized sampled pulsed multilevel voltage signal $g_i$ 62 having the precursor and postcursor intersymbol interference removed with the estimated pulsed multilevel voltage signal $\hat{a}_i$ to form the error signal $e_i$. The output $G_k$ 142 of the gain block 140 is an indication of the condition of the communication channel 10. The output $G_k$ 142 of the gain block 140 is determined by the formula:

$$G_k = G_{k-1} - \mu_{FF} e_i f_k \qquad \text{EQ. 7}$$

where:
$G_k$ is the current value of the gain constant at the output of the gain block 140.
$G_{k-1}$ is the previous value of the gain constant at the output of the gain block 140.
$\mu_{FF}$ is a small positive constant.
$f_k$ 55 is digitized and sampled pulsed multilevel voltage signal.
$e_i$ is the error signal indicating the condition of the communication channel 10.

The small positive constant $\mu_{FF}$ 420 is small enough to make the gain loop stable, but large enough to track slowly varying changes in the gain of the communication channel.

The gain-to-coefficient mapping block 145 has an initial value of gain constant for the gain block 140 and an initial value of filter coefficients for the feed forward filter 130. If the initial values of the gain constant $G_k$ 142 of the gain block 140 and the coefficients for the feed forward filter 130 are not sufficient to cancel the intersymbol interference then the adaptive gain loop will increment the gain constant $G_k$ 142 by some reasonable but arbitrary value. The filter coefficients of the feed forward filter 130 are found according to the formula:

$$w_{xnew} = w_{xold} + k * INC_{gain} \qquad \text{EQ. 8}$$

where:
$w_{xnew}$ is the new value of the filter coefficient of the feed forward filter 130.
$w_{xold}$ is the present value of the filter coefficient of the feed forward filter 130.
$INC_{gain}$ is the incremental change of the gain constant made by the adaptive gain loop to incorrect removal of the intersymbol interference.
k is a constant chosen by experience and testing or channel characterization. For example, the value of k is chosen to be 1/64 for 100BASE-T Ethernet systems using Cat-5 unshielded twisted pair cabling.

The output of the feed forward filter 130 is the input to the multiplier circuit 135. The second input of the multiplier circuit is the gain constant that is the output of the gain block 140. The multiplier circuit 135 has an output that is the product of the output of the feed forward filter 130 and the gain constant to form the digitized and sampled pulsed multilevel voltage signal $f_k$ 55 having the precursor intersymbol interference removed. The digitized and sampled pulsed multilevel voltage signal $f_k$ 55 is determined by the formula:

$$f_k = A_v(h_k + (h_{k+1}) * w - 1) \qquad \text{EQ. 9}$$

where:
$f_k$ is the digitized and sampled pulsed multilevel voltage signal.
$A_v$ is the gain constant of the gain block 140.
$h_k$ is the present sampled and digitized received pulsed multilevel voltage signal.
$h_{k+1}$ is the next sampled and digitized received pulsed multilevel voltage signal.
$w_{-1}$ is the filter coefficient mapped from the gain constant $A_v$ of the gain block 140.

The removal of a first precursor intersymbol interference is accomplished with appropriate selection of the timing phase of EQ. 5. This is controlled by the timing phase adjustment signal $\phi_{samp}$ 20.

The ADC, as is known in the art, is sampled at a critical edge of a sampling clock generated by a voltage-controlled oscillator (considered integral to the analog-to-digital converter 10 for this example). The timing phase adjustment signal $\phi_{samp}$ 20 is an input to the voltage controlled oscillator to adjust the placement of the critical edge of the sampling clock to appropriately set the timing phase to eliminate the first precursor intersymbol interference.

The output of the adaptive timing loop circuit 150 is the timing phase adjustment signal $\phi_{samp}$ 20. The inputs to the adaptive timing loop circuit 150 are the estimate of the pulsed multilevel voltage signal $\hat{a}_i$ 95, the error signal $e_i$ 155 and the control constant $\mu_t$ 165.

The control constant $\mu_t$ 165 is a small constant chosen to meet the requirements of a specific application. The control constant $\mu_t$ 165 should be small enough such that it can keep the timing loop stable and the gradient of the actual noise generated by the adaptive loop small. However, it should be large enough such that the timing loop can keep track of the slow timing variance of the communication channel 10.

The adaptive timing loop executes the formula:

$$\phi_{sampn+1} = \phi_{sampn} - \mu_t(\hat{a}_i e_{i-1})$$

where:

$\phi_{sampon+1}$ is the timing phase adjustment signal for the next sample $h_{n+1}$ 25 from the analog-to-digital converter 15, $\Phi_{sampn}$ is the timing phase adjustment signal for the current sample $h_n$ 25 from the analog-to-digital converter 15, $\mu_t$ is the control constant.

$e_{i-1}$ is the error signal for the previous sample.

From EQ 6, it can be seen that the components of the feed forward filter 130 with the gain-to-coefficient mapping block 145, and the gain block 140, as described above, eliminate the post cursor intersymbol interference components ($a_{i-1}$ $f_{+1}+ \ldots$). EQ. 6 can thus be reduced to the equation:

$$y_i = a_{i+1} f_{-1} + a_i f_0$$

The error signal $e_i$ 155 is then only the precursor intersymbol interference component $a_{i+1} f_{-1}$. If that frequency component is successfully nulled by appropriate selection of the timing sampling phase $\phi_{samp}$ 20, then the precursor intersymbol interference is removed. To extract the timing information, the sign of the frequency component $f_{-1}$ indicates whether the timing sampling phase $\phi_{samp}$ is before or after the zero crossing point $-ZC$ of FIG. 1b. To determine the sign of the frequency component $f_{-1}$, the error signal is multiplied by the estimate of the pulsed multilevel voltage signal $\hat{a}_i$ 95. The sign of this multiplication is only the sign of the frequency component $f_{-1}$. That is since $$e_i = \hat{a}_{i+1} f_{-1} \text{ then}$$

$$\hat{a}_{i+1} e_i = (\hat{a}_{+1})^2 f_{-1}.$$

As can be seen from the above equation, this provides an adaptive adjustment to the timing phase adjustment signal to minimize the precursor interference.

The adaptive timing loop adjusts the timing phase such that it is at the zero decibel (dB) crossing of the frequency response of the communication channel 10. This is the position where the precursor noise is approaching a zero level. The error signal $e_{i-1}$ is essentially the precursor intersymbol interference, once the post cursor intersymbol interference has been removed. Therefore the multiplication of the error signal by the estimated value of the estimated pulsed multilevel voltage signal $\hat{a}_i$ gives an estimate of the sign of the value of the frequency component $f_{i-1}$ of the precursor interference. This allows the timing of the information to be extracted to indicate the offset of the timing phase (the sign frequency component $f_{i-1}$ of the precursor interference) determines the correction required in the timing phase adjustment signal $\phi_{sampn}$ of the sampling clock.

The digitized and sampled pulsed multilevel voltage signal $f_x$ is the input to the combining circuit 60. The second input of the combining circuit 60, as described in FIG. 1, is the output of the feedback filter 70. The combining circuit 60 subtractively combines the output of the digitized and sampled pulsed multilevel voltage signal $f_k$ having the precursor intersymbol interference removed with the output of the feedback filter 70 to generate the digitized and sampled pulsed multilevel voltage signal $g_i$ 62 having all intersymbol interference removed.

The output $g_i$ 62 of the combining circuit 60 is the input of the decision circuit 65. The decision circuit 65 generates the estimated pulsed multilevel voltage signal $\hat{a}_i$ 95. The estimated pulsed multilevel voltage signal $\hat{a}_i$ 95 is transferred to an external circuit for decoding and error correction to recreate the transmitted digital data.

The estimated pulsed multilevel voltage signal $\hat{a}_i$ 95 is the input to the feedback filter 70. The feedback filter 70, as describes in FIG. 1, generates a representative form of the postcursor intersymbol interference that is to be subtracted from the digitized and sampled pulsed multilevel voltage signal $f_k$.

Figure 4A:
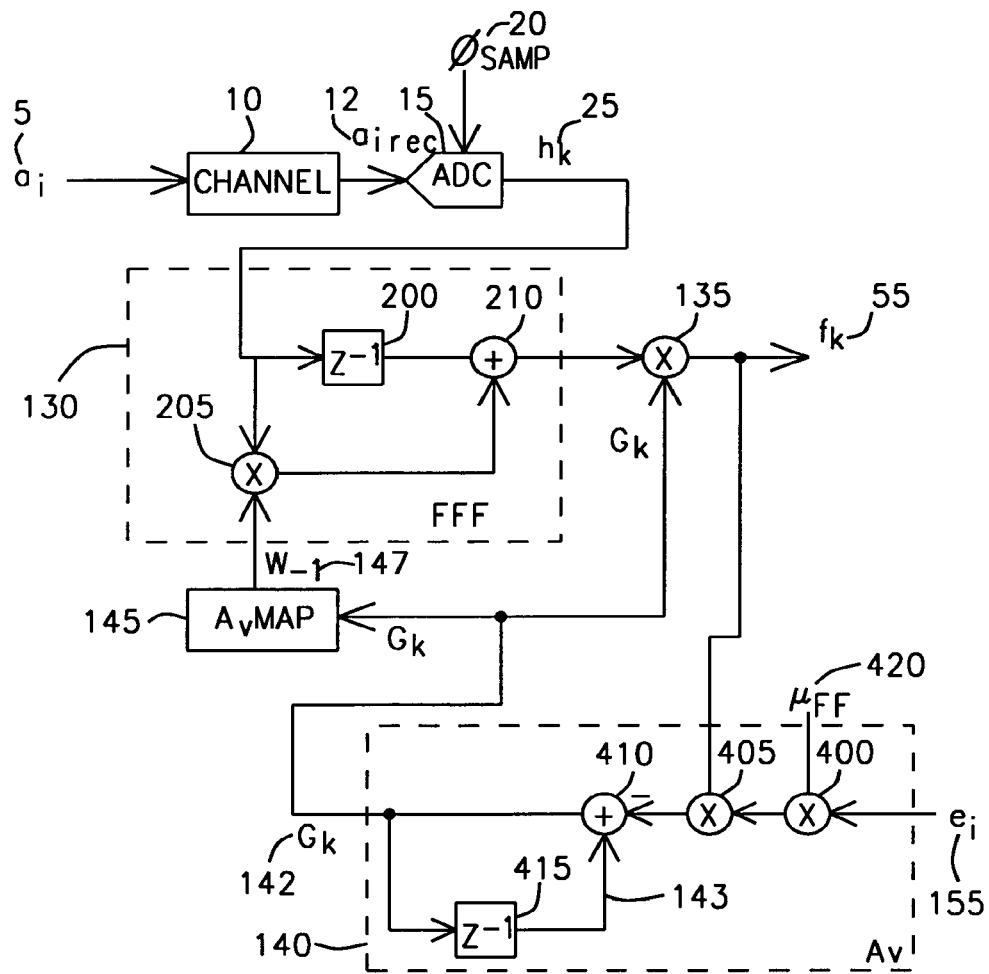
FIG. 4a is a schematic diagram of one embodiment of an open loop feed forward equalizer of this invention.
Figure 4B:
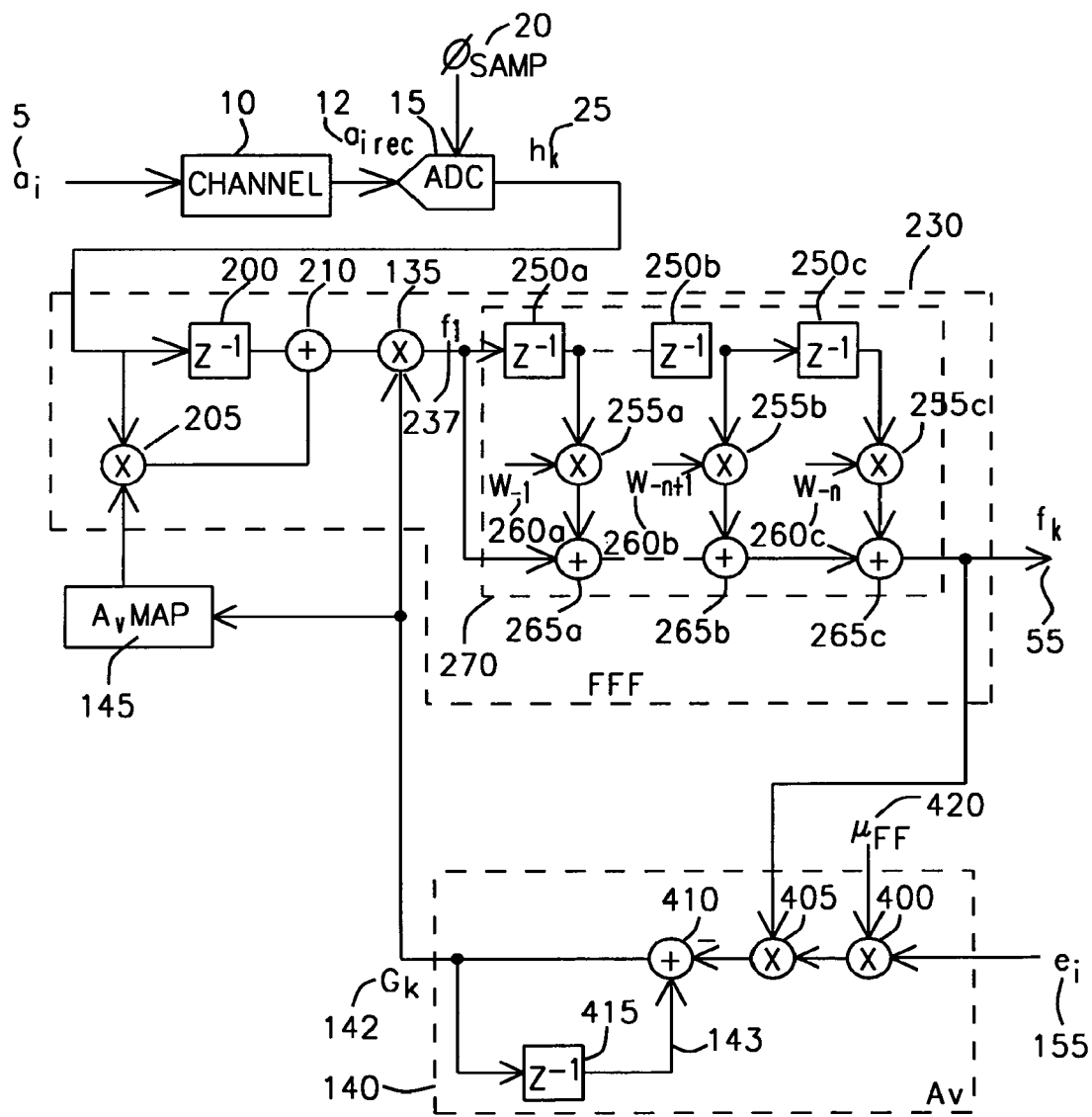
FIG. 4b is a schematic diagram of a second embodiment of an open loop feed forward equalizer of this invention.

Refer now to FIGS. 4a and 4b to discuss the structure of the open loop feed forward filter 130 of FIG. 3. FIG. 4a shows the open loop feed forward filter 130 having one tap to remove any of the precursor intersymbol interference from the digitized and sampled pulsed multilevel voltage signal $h_k$ 25. The feed forward filter 130 consists of a first delay element 200 that delays the digitized and sampled pulsed multilevel voltage signal $h_k$ 25 by the time period equal to the period of the feed forward filter of the analog-to-digital converter 15.

The digitized and sampled pulsed multilevel voltage signal $h_k$ 25 is the first input to the multiplier circuit 205. The second input to the multiplier circuit 205 is the filter coefficient $w_{-1}$ 147. The output of the multiplier circuit 205 is the product of the digitized and sampled pulsed multilevel voltage signal $h_k$ 25 and the filter coefficient $w_{-1}$ 147.

The output of the delay element 200 and the output of the multiplier circuit 205 are the inputs of the combining circuit 210. The output of the combining circuit 210 is the additive combination of the delayed version of the digitized and sampled pulsed multilevel voltage signal $H_{k-1}$ and the product of the digitized and sampled pulsed multilevel voltage signal $h_k$ 25 and the filter coefficient $w_{-1}$ 147. The output of the combining circuit 210 is the output of the feed forward filter 130 and is connected, as described above, to the multiplier circuit 135. The output of the combining circuit 210 is multiplied by the gain constant $G_k$ 142 in the multiplier circuit 135 to generate the digitized and sampled pulsed multilevel voltage signal $f_k$ 55 that has the precursor intersymbol interference removed.

The gain block 140 has two multiplier circuits 400 and 405 that multiply the error signal $e_i$ 155, the feed forward constant $\mu_{FF}$ 420, and the digitized and sampled pulsed multilevel voltage signal $f_k$ 55 to produce the indication of the condition of the communication channel 10.

The delay element 415 is connected to the output of the gain block 140 and delays the present value of the gain constant $G_k$ 142 by one sampling of the received signal $a_{irec}$. The delayed version of the gain constant $G_{k-1}$ 143 is subtractively combined in the combining block 410 to form the gain constant $G_k$ 142 for the next sampling of the received signal $a_{irec}$.

An alternative embodiment, as shown in FIG. 4b, illustrates a feed forward filter 230 having multiple taps or filter coefficients. In this case, the first tap of the feed forward filter 230 is the open loop feed forward filter 130 of FIG. 3, as described in FIG. 4a and incorporates the multiplier circuit 135 of FIG. 3. The remaining taps 270 of the feed forward filter 230 are adaptive loops as shown in FIG. 1. The output $f_1$ 237 of the multiplier circuit 235 is the digitized and sampled pulsed multilevel voltage signal having most precursor symbols of the precursor intersymbol interference removed. Any residual precursor symbols of the precursor intersymbol interference is removed by the remaining taps 270 of the feed forward filter 230.

The remaining taps 270 of the feed forward filter 230 consist of multiple delay elements 250a, 250b, and 250c that are serially connected output to input. The input of the first delay element is connected to the output $f_i$ 237 of the multiplier circuit 235.

Each delay element 250a, 250b, and 250c delays the output $f_i$ 237 of the multiplier circuit 235 by the amount of time of the period of the sampling clock of the analog-to-digital converter 15. The outputs of the delay elements 250a, 250b, and 250c respectively are connected to the multiplier circuit 255a, 255b, and 255c. Each delayed version of the output $f_i$ 237 of the multiplier circuit 235 is multiplied by one of the filter coefficients $w_x$ 260a, 260b, and 260c.

The output of each of the multiplier circuits 255a, 255b, and 255c are connected to the combining circuits 265a, 265b, and 265c. The combining circuits 265a, 265b, and 265c additively combine the resulting products from the multiplier circuits 255a, 255b, and 255c with the output $f_1$ 237 of the multiplier circuit 235 to form the sampled digitized signal $f_k$ 55 having the precursor intersymbol interference.

The filter coefficients normally are chosen as a function of an error signal determined as the difference of the estimate value $\hat{a}_i$ 95 of the pulsed multilevel voltage signal $a_i$ 5 and the sampled digitized signal $f_k$ 55 having the precursor intersymbol interference removed.

Figure 5:
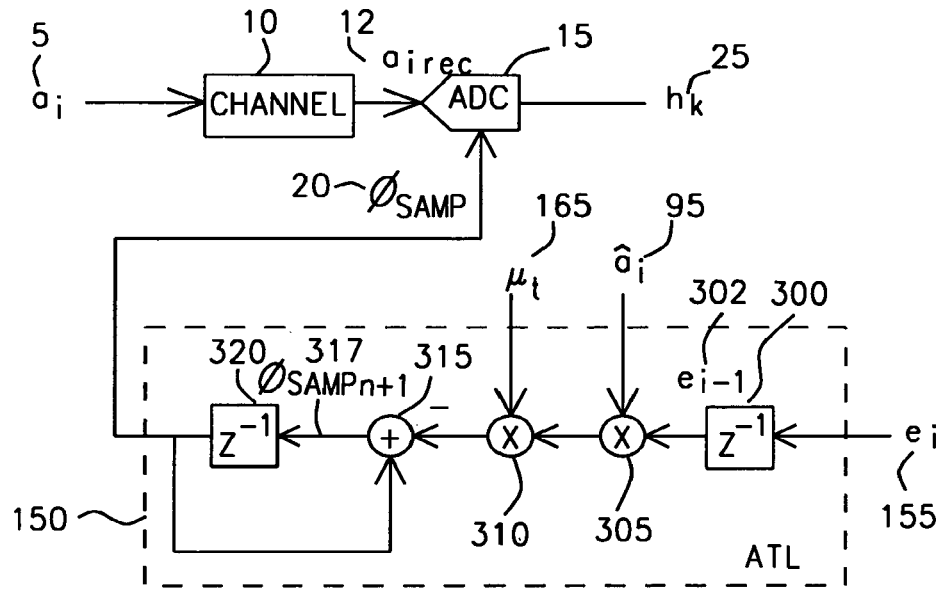
FIG. 5 is a schematic diagram of an adaptive timing loop of this invention.

Refer now to FIG. 5. to discuss the structure of the adaptive timing loop 150 of FIG. 3. As described above, the error signal $e_i$ 155, the estimate $\hat{a}_i$ 95 of the pulsed multilevel voltage signal $a_i$, and the control constant $\mu_\tau$ are the inputs to the adaptive timing loop circuit 150. The adaptive timing loop circuit 150 has a delay element 300 that receives the error signal $e_i$ 155. The delay element 300 delays the error signal by the time equal to the period of the sampling clock of the analog-to-digital converter 15. The delayed error signal $e_{i-1}$ 302 and the estimated pulsed multilevel voltage signal $\hat{a}_i$ 95 are the inputs to the multiplier circuit 305. The output of the multiplier circuit 305 is the product of the delayed error signal $e_{i-1}$ 302 and the estimated pulsed multilevel voltage signal $\hat{a}_i$ 95. The inputs of the multiplier circuit 310 is the gain constant $\mu_\tau$ 165 and the output of the multiplier circuit 305. The output of the multiplier circuit 310 is the product of the gain constant m and the output of the multiplier circuit 305.

The inputs of the combining circuit 315 are the output of the multiplier circuit 310 and the current value of the timing phase adjustment signal $\phi_{samp}$ 20. The combining circuit 315 subtractively combines the current value timing phase adjustment signal $\phi_{samp}$ 20 and the output of the multiplier circuit 310 to form the next value of the timing phase adjustment signal $\phi_{sampn+1}$ 317. The delay element 320 delays the next value of the timing phase adjustment signal $\phi_{sampn+1}$ 317 to adjust the timing phase of the next sampling clock sufficiently to remove the first precursor intersymbol interference from the received pulsed multilevel voltage signal $a_{irec}$ 12.

It is well-known in the art that, while the above describes individual circuitry to implement an apparatus that removes the precursor intersymbol interference from the received pulsed multilevel voltage signal, the apparatus may be implemented as a program code for execution on a computational processor. The program code maybe obtained from media such as storage nodes of an internal or external network or stored on a storage media such as read only memory (ROM) or a magnetic disk. Further, the apparatus that will remove the precursor intersymbol interference may be implemented as analog filters using continuous time processing.

Figure 6A:
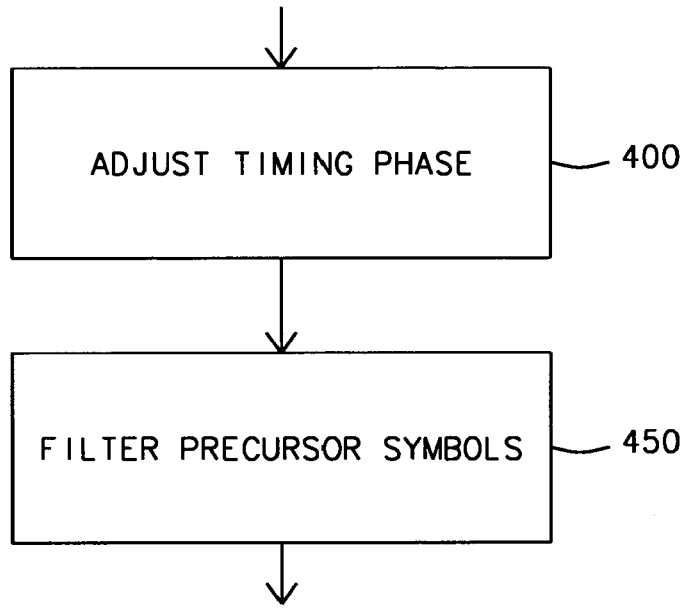
FIGS. 6a-6c are flowcharts outlining the method for canceling precursor intersymbol interference from an encoded signal.
Figure 6B:
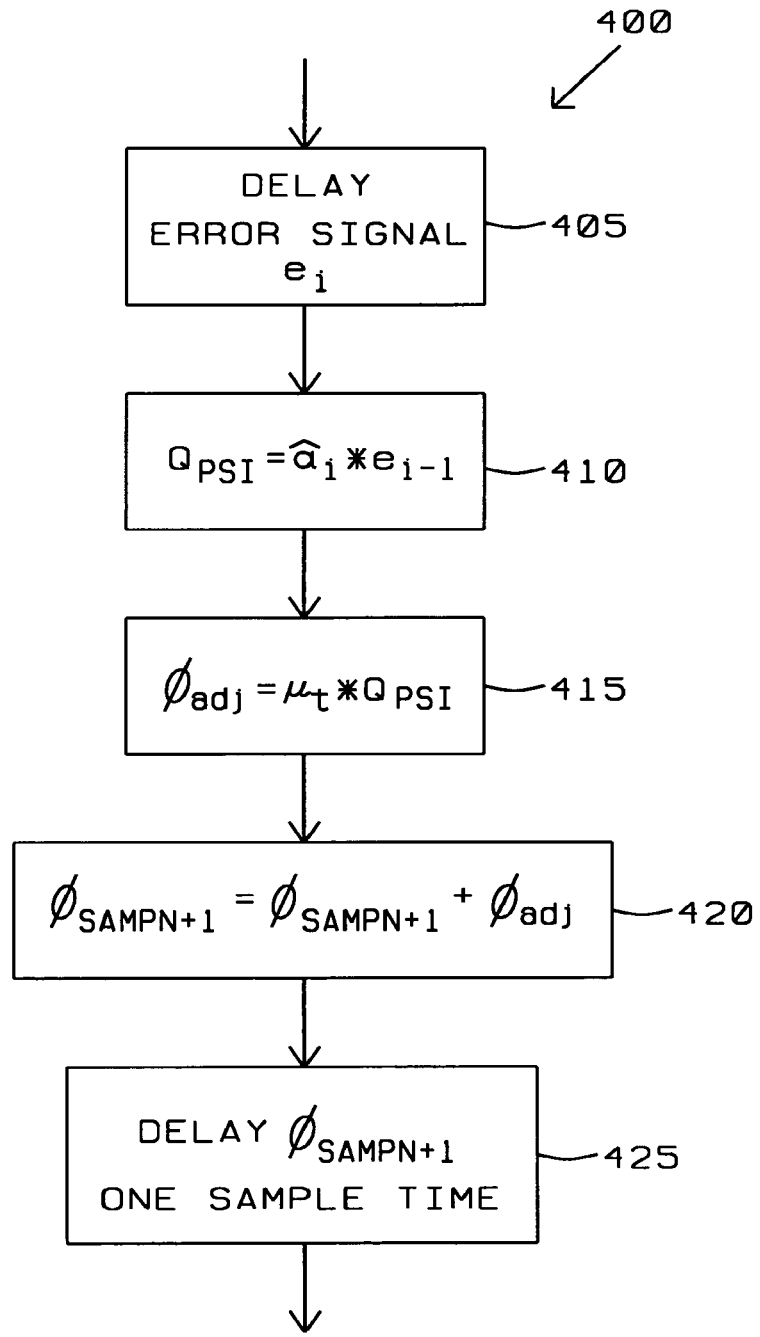
Figure 6C:
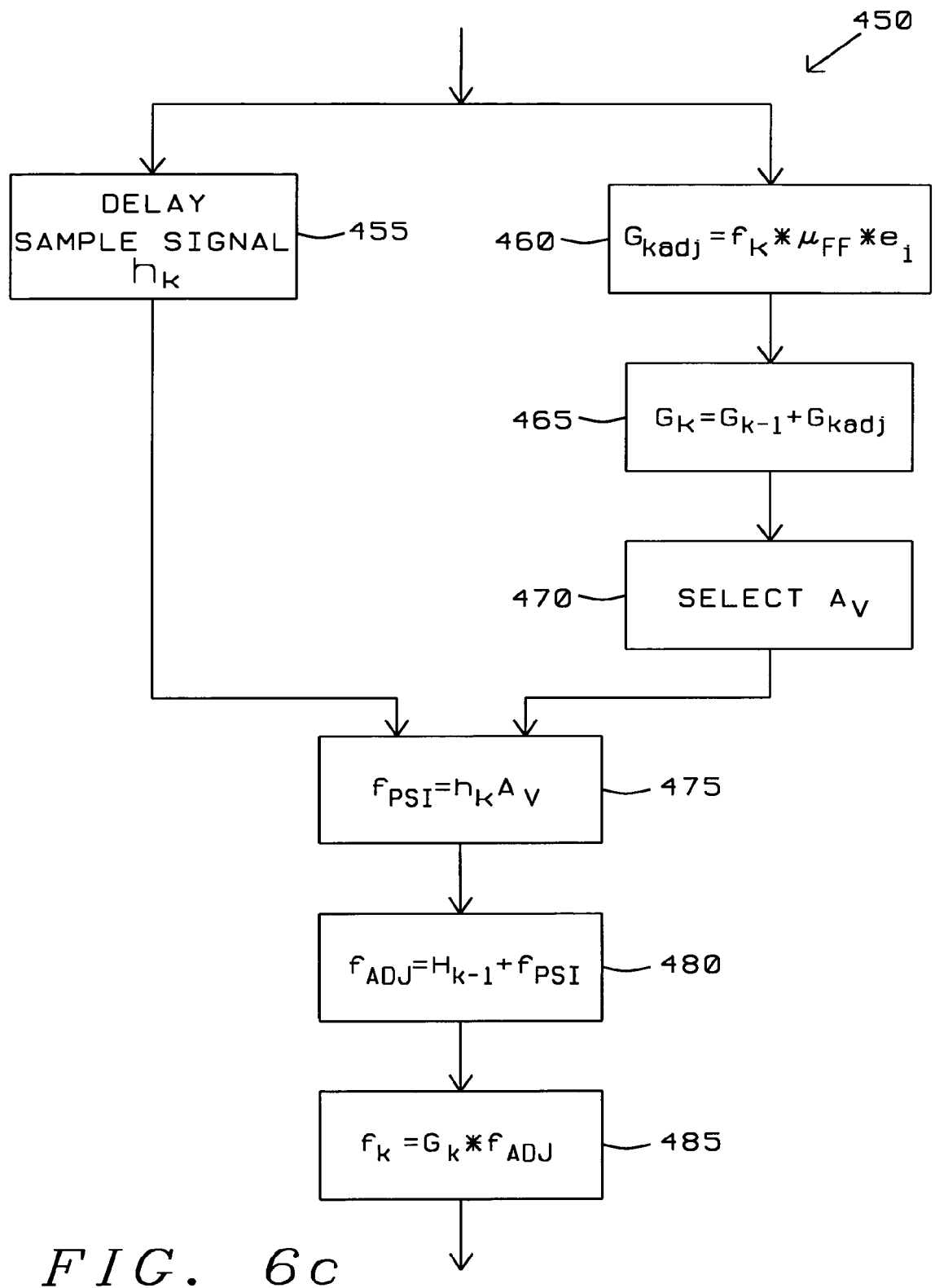

In summary, the method for removing precursor intersymbol interference from a sampled, received, and digitized multilevel voltage signal, as shown in FIGS. 6a-6c, begins by adjusting a timing phase 400 of the sampling clock to remove a first precursor symbol interference from the precursor intersymbol interferences. After the timing phase is adjusted the method continues by filtering 450 any remaining precursor symbols of the precursor intersymbol interference with an open loop finite impulse response filter having a filter coefficient that is a function of a fixed gain parameter that is indicative of a condition of the communication channel.

The adjusting the timing phase 400 of the sampling clock begins by delaying 405 an error signal by one sampling period of the sampling clock. The error signal is a difference between an estimate of data transmitted on the communication channel and an equalized version of the received and sampled encoded signal and is indicative of an amount of the first precursor symbol interference. The adjusting of the timing phase 400 continues by multiplying 410 the estimate of the transmitted data by the error signal to form a first product. The first product is then further multiplied 415 by a loop gain control constant to form a second product. The second product is then subtractively combined 420 with a current timing phase adjustment to form a next timing phase adjustment. The next timing phase adjustment is then delayed 425 to align with a next sampling clock. The generating a next sample phase adjustment according to the formula of EQ. 8.

The filtering 450 any remaining precursor symbol interference is accomplished by first delaying 455 by one period of the sampling clock the encoded signal that is received and sampled and then multiplying 475 the encoded signal that is received and sampled by a filter coefficient to form a fourth product. The fourth product is then additively combined 480 with a previous sample of the encoded signal to form a preliminary equalized signal. The preliminary equalized signal is then multiplied 485 by a constant gain factor to produce a signal having the precursor intersymbol interference removed. The constant gain factor is set 460, 465 as a function of the channel condition as indicated by the error signal $e_i$ and the filter coefficient is a mapping 470 of the constant gain factor. This filtering of any remaining precursor symbol interference is accomplished such that the encoded signal that is received and sampled with the phase adjusted sampling clock is modified according to the formula of EQ. 9

While this invention has been particularly shown and described with reference to the preferred embodiments thereof, it will be understood by those skilled in the art that various changes in form and details may be made without departing from the spirit and scope of the invention.

What is claimed is:

1. A communication device, comprising:
   circuitry configured to receive a signal transmitted to the communication device via a communication channel; and
   a receiver configured to
   sample the received signal in accordance with a clock signal,
   adjust, based on an estimate of a pulsed multilevel voltage signal corresponding to the received signal, a timing phase of the clock signal to remove intersymbol interference from the received signal,
   generate a filter coefficient to be used for filtering the received signal,
   generate a gain coefficient, wherein the gain coefficient corresponds to a condition of the communication channel,
   adjust the filter coefficient using the gain coefficient, and
   filter the received signal using the filter coefficient, as adjusted using the gain coefficient, to further remove intersymbol interference from the received signal,
   wherein, to sample the received signal in accordance with the clock signal, the receiver includes an analog to digital receiver configured to sample the received signal,
   wherein, to adjust the timing phase of the clock signal to remove the intersymbol interference from the received signal, the receiver includes a timing loop configured to adjust the timing phase of the clock signal, and
   wherein, to adjust the timing phase of the clock signal, the timing loop is configured to adjust the timing phase further based on a loop gain control constant.

2. The communication device of claim 1, wherein the timing loop includes i) a first multiplier circuit configured to receive an estimate signal based on the estimate of the pulsed multilevel voltage signal and ii) a second multiplier circuit configured to receive the loop gain control constant.

3. The communication device of claim 1, wherein the receiver includes a filter configured to remove the intersymbol interference from the received signal.

4. The communication device of claim 3, wherein the filter corresponds to an open loop finite impulse response filter.

5. The communication device of claim 3, wherein the filter is configured to output a signal according to $f_k=A_v(h_k+(h_{k+1})*w_{-1})$, wherein:
- $f_k$ is a digitized and sampled pulsed multilevel voltage signal;
- $A_v$ is a gain constant of a gain block;
- $h_k$ is a present sampled and digitized received pulsed multilevel voltage signal;
- $h_{k+1}$ is a next sampled and digitized received pulsed multilevel voltage signal; and
- $w_{-1}$ is a filter coefficient mapped from the gain constant $A_v$.

6. A method, comprising:
- receiving a signal transmitted over a communication channel;
- sampling the received signal in accordance with a clock signal,
- adjusting, based on an estimate of a pulsed multilevel voltage signal corresponding to the received signal, a timing phase of the clock signal to remove intersymbol interference from the received signal,
- generating a filter coefficient to be used for filtering the received signal;
- generating a gain coefficient, wherein the gain coefficient corresponds to a condition of the communication channel;
- adjusting the filter coefficient using the gain coefficient; and
- filtering the received signal using the filter coefficient, as adjusted using the gain coefficient, to further remove intersymbol interference from the received signal,
- wherein adjusting the timing phase of the clock signal includes adjusting the timing phase further based on a loop gain control constant.

7. The method of claim 6, wherein filtering the received signal includes filtering the received signal using an open loop finite impulse response filter.

8. The method of claim 7, further comprising outputting a signal according to $f_k=A_v(h_k+(h_{k+1})*w_{-1})$, wherein:
- $f_k$ is a digitized and sampled pulsed multilevel voltage signal;
- $A_v$ is a gain constant;
- $h_k$ is a present sampled and digitized received pulsed multilevel voltage signal;
- $h_{k+1}$ is a next sampled and digitized received pulsed multilevel voltage signal; and
- $w_{-1}$ is a filter coefficient mapped from the gain constant $A_v$.

* * * * *